United States Patent
Li et al.

(10) Patent No.: US 9,871,912 B2
(45) Date of Patent: Jan. 16, 2018

(54) DETECTING CONFERENCE CALL PERFORMANCE ISSUE FROM ABERRANT BEHAVIOR

(71) Applicant: Dolby Laboratories Licensing Corporation, San Francisco, CA (US)

(72) Inventors: Kai Li, Beijing (CN); Glenn N. Dickins, Como (AU); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/109,511

(22) PCT Filed: Jan. 6, 2015

(86) PCT No.: PCT/US2015/010237
§ 371 (c)(1),
(2) Date: Jul. 1, 2016

(87) PCT Pub. No.: WO2015/105764
PCT Pub. Date: Jul. 16, 2015

(65) Prior Publication Data
US 2016/0337510 A1    Nov. 17, 2016

Related U.S. Application Data

(60) Provisional application No. 61/932,504, filed on Jan. 28, 2014.

(30) Foreign Application Priority Data

Jan. 8, 2014  (CN) .......................... 2014 1 0008285

(51) Int. Cl.
*H04M 1/24*  (2006.01)
*H04M 3/08*  (2006.01)
(Continued)

(52) U.S. Cl.
CPC ........... *H04M 3/2227* (2013.01); *G10L 25/60* (2013.01); *G10L 25/63* (2013.01);
(Continued)

(58) Field of Classification Search
CPC .... H04M 2203/50; H04M 3/56; H04M 3/569; G06F 3/0433; H04L 12/18; H04L 12/1831; H04N 7/15
(Continued)

(56) References Cited

U.S. PATENT DOCUMENTS 6,049,599 A * 4/2000 McCausland ......... H04M 15/00
                                                      379/111
6,343,313 B1   1/2002 Salesky
(Continued)

FOREIGN PATENT DOCUMENTS

WO    2001/017169    3/2001
WO    2012/120339    9/2012
(Continued)

OTHER PUBLICATIONS

ETSI ETR 250: "Transmission and Multiplexing (TM); Speech Communication Quality from Mouth to Ear for 3,1 kHz Handset Telephony Across Networks" European Telecommunications Standards Institute, Jul. 1996.
(Continued)

*Primary Examiner* — Binh K Tieu

(57) ABSTRACT

In a conference call having a plurality of participants interacting in a conference exchange of information in a digital transmission environment, the interaction being across a variable network transmission resource, a method of allocating the level of transmission resource, the methods including the steps of: (a) monitoring predetermined aspects of the participant's behavior during the conference call; (b) determining a divergence of participants behavior from
(Continued)

normative values; (c) utilizing any divergence as an indicator of aberrant operation of the participants; and (d) allocating the resource determinative on the divergence of participants behavior from normative values.

9 Claims, 7 Drawing Sheets

(51) Int. Cl.
*H04M 3/22* (2006.01)
*H04M 3/00* (2006.01)
*H04M 5/00* (2006.01)
*H04M 3/56* (2006.01)
*G10L 25/63* (2013.01)
*G10L 25/60* (2013.01)
*H04L 12/24* (2006.01)

(52) U.S. Cl.
CPC ...... *H04L 41/5009* (2013.01); *H04M 3/2236* (2013.01); *H04M 3/568* (2013.01); *H04M 3/569* (2013.01); *H04M 2203/2038* (2013.01)

(58) Field of Classification Search
USPC .......... 379/32.01, 32.02, 32.04, 202.01, 111, 379/265.01, 265.03, 265.06; 370/242, 370/244, 252, 260
See application file for complete search history.

(56) References Cited

U.S. PATENT DOCUMENTS

| | | | |
|---|---|---|---|
| 6,611,867 | B1 | 8/2003 | Bowman-Amuah |
| 7,024,398 | B2* | 4/2006 | Kilgard ................. A61B 5/16 706/25 |
| 7,319,745 | B1 | 1/2008 | Firestone |
| 7,403,487 | B1 | 7/2008 | Foladare |
| 7,974,422 | B1* | 7/2011 | Ho ........................ H04H 60/04 381/119 |
| 8,275,843 | B2 | 9/2012 | Anantharaman |
| 8,306,057 | B1 | 11/2012 | Khan |
| 8,929,529 | B2* | 1/2015 | Beerse .................. H04M 3/566 379/202.01 |
| 9,131,053 | B1* | 9/2015 | Tan ..................... H04M 3/5175 |
| 2009/0201824 | A1 | 8/2009 | Leung |
| 2009/0225670 | A1 | 9/2009 | Leung |
| 2009/0237240 | A1 | 9/2009 | Leung |
| 2009/0257361 | A1 | 10/2009 | Deshpande |
| 2010/0020728 | A1 | 1/2010 | Jefferson |
| 2011/0295392 | A1 | 12/2011 | Cunnington |
| 2012/0047152 | A1 | 2/2012 | Purdy |
| 2013/0036117 | A1 | 2/2013 | Fisher |
| 2013/0124631 | A1* | 5/2013 | Rosansky ........... H04L 65/1069 709/204 |
| 2014/0003595 | A1* | 1/2014 | Beerse .................. H04M 3/566 379/201.02 |
| 2014/0093059 | A1* | 4/2014 | Kanevsky ........... H04M 3/2227 379/202.01 |
| 2014/0189016 | A1* | 7/2014 | Goldsmith ............. G06Q 10/06 709/205 |
| 2015/0207710 | A1 | 7/2015 | Dickins |
| 2015/0278730 | A1* | 10/2015 | Goldsmith ............. G06Q 10/06 705/7.28 |
| 2015/0304381 | A1* | 10/2015 | Rosansky ............... H04L 65/80 370/259 |
| 2016/0255466 | A1* | 9/2016 | Shuster ................. H04W 4/023 455/414.3 |

FOREIGN PATENT DOCUMENTS

| | | |
|---|---|---|
| WO | 2013/142727 | 9/2013 |
| WO | 2014/004224 | 1/2014 |

OTHER PUBLICATIONS

ITU-T G.114, "One Way Transmission Time" 2003.
ITU-T P.800, "Methods for Subjective Determination of Transmission Quality" Series P: Telephone Transmission Quality, Aug. 1996.
Ramachandran, K. et al "Supporting Enterprise-Grade Audio Conferencing on the Internet" vol. 5448 Proc. of the 10th International Conference on Passive and Active Network Measurement Springer-Verlag Berlin, Heidelberg, pp. 143-152, 2009.
Yin, B. et al "Towards Automatic Cognitive Load Measurement from Speech Analysis" Human-Computer Interaction, Interaction Design and Usability Springer Berlin, pp. 1011-1020, 2007.
Wei, P.D. et al "Modeling Dynamical Influence in Human Interaction: Using Data to Make Better Inferences about Influence within Social Systems" IEEE Signal Processing Magazine, vol. 29, Issue 2, pp. 77-86, published in Mar. 2012.
Goodwin, Charles "Conversational Organization: Interaction Between Speakers and Hearers" Academic Press, New York, NY, Jan. 1981.
Clark, H.H. et al "Hearers and Speech Acts" pp. 332-373, Jun. 1982.
Blundell, N. et al "Towards (perceived) Latency Minimisation in Audio-Conferencing Systems OverApplication-Level Multicast" IEEE International Conference on Systems, Man and Cybernetics, Oct. 10-13, 2004, pp. 4612-4618, vol. 5.
Dong, W et al. "Automatic Prediction of Small Group Performance in Information Sharing Tasks" Proc. CI2012, Collective Intelligence, MIT, Cambridge, 2012.

* cited by examiner

US 9,871,912 B2

DETECTING CONFERENCE CALL PERFORMANCE ISSUE FROM ABERRANT BEHAVIOR

CROSS-REFERENCE TO RELATED APPLICATIONS

This application claims priority from Chinese Priority Patent Application No. 201410008285.3 filed 8 Jan. 2014 and U.S. Provisional Patent Application No. 61/932,504 filed 28 Jan. 2014, both of which are hereby incorporated by reference in their entirety.

FIELD OF THE INVENTION

The present invention relates to the monitoring of conference calls or the like, and, in particular, techniques in detecting conference call performance from the participant's behavior.

BACKGROUND

Any discussion of the background art throughout the specification should in no way be considered as an admission that such art is widely known or forms part of common general knowledge in the field.

In teleconferencing, the measurement and management of the user call quality experience (sometimes loosely referred to as the Quality of Service—QoS) is an important part of assembled and or integrated voice and video conferencing systems.

The QoS is used as a measure of the user experience and likelihood of complaint about the service quality. Since the provision of higher quality network links is normally directly related to the cost of operation, QoS measures are routinely used to balance the allocation of resources to match the required QoS against the premium price structures and requirements for customer retention. Since customer complaints as expensive, and customer churn (migration of customers between service providers) is important to minimize, the balance of these two factors is critical to the operating efficiency and profit of any voice or video conferencing operator. In summary, the two factors that are balanced using a measure (objective, subjective or complaint based) of the user experience based on QoS, service provision cost due to bandwidth, server processing loads, server location or managed proximity and network link quality. Increasing any or all of these adds cost to the service provider.

Perceived fault conditions attributed to the operator increase the level of customer complaints, lower the user experience and ultimately can lead to customer loss.

There are many known systems for the measurement of QoS. In particular, a prevalence in techniques to estimate the individual link and aggregate QoS. The most common measure of individual link quality is a Mean Opinion Score (MOS) defined in (ITU 1996). Known systems are often associated with the estimation of a measure related to the MOS against the voice, background noise, interaction and overall conference experience. The following prior art is cited as exemplary disclosures in this space:

United States Patent Publication US 2009/0257361 proposes the use of a shadow server to monitor link quality and associate with call link quality;

(ETSI_TC-TM 1996) Discloses an E-model that has a low computational complexity means of estimation of the call channel quality;

(Ramachandran and Beeram 2009) United States Patent Publications US20090237240 and US20090201824 provide a method for assembling a set of physical parameters that contribute to call issues;

United States Patent Publication US2009/0225670 provides a means of aggregating individual Link QoS measures to provide an overall conference QoS.

IT (ITU-T G.114 2003) provides a prediction of MOS degradation related to network link latency.

U.S. Pat. Nos. 7,403,487 and 6,343,313 also provide for example systems for the measurement of QoS levels in networked conferencing environments.

Most of the known systems, on first inspection, appear to focus on the time delay (i.e. latency) between users in the communications channel, and also the connection and disconnection times (i.e. of the device connection itself) in the estimation of the QoS. As such, the reference to metrics and quality of service relate to the standard metrics of the audio quality, interaction latency and therefore the likely degree of over talk, and other simple metrics such as packet loss. These can be referred to as 'physical metrics' as they represent some fairly simple and measurable aspect of the physical (or associated software and network) system and its performance. The level of degradation of call quality is inferred, using models such as (ETSI_TC-TM 1996) from the physical observable parameters.

'In Service Monitoring' (ISM) is often a key feature in prior art Voice systems. ISM is used for monitoring the system and becoming aware of degradation of quality before losing customers. In some cases it can be used to achieve lowest cost by maintaining the lowest acceptable quality to users. However, detectable issues with audio and system performance are not always linked to user complaint. Sometime the fault mode is known to, and accepted by the user (for example using a phone in a noise public space giving poor audio quality). In other cases, the form of the distortion may be perceptually insignificant despite some conventional objective measure noting it is high.

REFERENCES

Blundell, N. and L. Mathy (2004). *Towards (perceived) latency minimisation in audio-conferencing systems over application-level multicast*. Systems, Man and Cybernetics, 2004 IEEE International Conference on.

Dong, W., B. Lepri, et al. (2012). *Automatic Prediction of Small Group Performance in Information Sharing Tasks*. Collective Intelligence, MIT, Cambridge.

ETSI_TC-TM (1996). ETR 250: Transmission and Multiplexing (TM); Speech communication quality from mouth to ear for 3.1 kHz handset telephony across networks. European Telecommunications Standards Institute.

ITU-T G.114 (2003). One-way transmission time, ITU. Report on the impact of mouth to ear delay on the quality of voice ITU (1996). "P.800: Methods for subjective determination of transmission quality." *Terminals and subjective and objective assessment methods*. from http://www.itu.int/rec/T-REC-P.800-199608-I/en.

Ramachandran, K. and S. Beeram (2009). *Supporting Enterprise-Grade Audio Conferencing on the Internet*. PAM '09 Proceedings of the 10th International Conference on Passive and Active Network Measurement Springer-Verlag Berlin, Heidelberg.

Wei, P., D. Wen, et al. (2012). "Modeling Dynamical Influence in Human Interaction: Using data to make better inferences about influence within social systems." *Signal Processing Magazine, IEEE* 29(2): 77-86.

Yin, B. and F. Chen (2007). Towards Automatic Cognitive Load Measurement from Speech Analysis. *Human-Computer Interaction. Interaction Design and Usability.* J. Jacko, Springer Berlin/Heidelberg. 4550: 1011-1020.

C. Goodwin. Conversational Organization: Interaction Between Speakers and Hearers. Academic Press, New York, N.Y., 1981.

H. H. Clark and T. B. Carlson. Hearers and speech acts. Language, 58(2): 332-373, June 1982.

SUMMARY OF THE INVENTION

It is an object of the invention, in its preferred form to provide a system for monitoring of conference calls or the like, and, in particular, techniques in detecting conference call performance from the participant's behavior.

In accordance with a first aspect of the present invention, there is provided in a conference call having a plurality of participants interacting in a conference exchange of information in a digital transmission environment, the interaction being across a variable network transmission resource, a method of allocating the level of transmission resource, the methods including the steps of: (a) monitoring predetermined aspects of the participant's behavior during the conference call; (b) determining a divergence of participants behavior from normative values; (c) utilising any divergence as an indicator of aberrant operation of the participants; and (d) allocating the resource determinative on the divergence of participants behavior from normative values.

The monitoring step preferably can include: (a) using a first classifier for monitoring normative behavior; (b) using at least a second classifier for monitoring one of conference mutual silence, single talk analysis, overlapped talk analysis, speech alternate rates, microphone mute analysis or link failure rate; and (c) using a combination unit for combining outputs from at least the first and second classifier to produce an output of the likely degree of aberrant operation.

In accordance with a further aspect of the present invention, there is provided a system for determining the underlying quality of service provided to participants at endpoints in a networked conferencing system, the system including: a series of collection units for collection and aggregation of system state information from the participating endpoints of a conference; a first classification unit, for classifying the conference activity as being normative of an effective meeting between the participants; at least a second classification unit for classifying the conference activity as being non-normative of an effective meeting between the participants; and an aggregator interconnected to the first classification unit and at least the second classification unit, the aggregator determining there from a fault likelihood level and confidence level based on the output from the first and second classification unit.

In some embodiments, at least one of the collection unit collects information including the synchronized voice or communication activity of participants at each end point. In some embodiments, the system state information preferably can include the voice level changes over time at each endpoint. In some embodiments, the system state information preferably can include the residual echo level change over time at each endpoint. In some embodiments, the system state information preferably can include mutual silence of the participants over time at each endpoint. In some embodiments, the system state information preferably can include the degree of overlap in speech of the participants. In some embodiments, the system state information preferably can include the microphone mute changes of the participants. In some embodiments, the system state information preferably can include single-talk of the participant over time at each endpoint. In some embodiments, the system state information preferably can include link failure and reconnection of the participants.

BRIEF DESCRIPTION OF THE DRAWINGS

Embodiments of the invention will now be described, by way of example only, with reference to the accompanying drawings in which.

DETAILED DESCRIPTION

Figure 1:
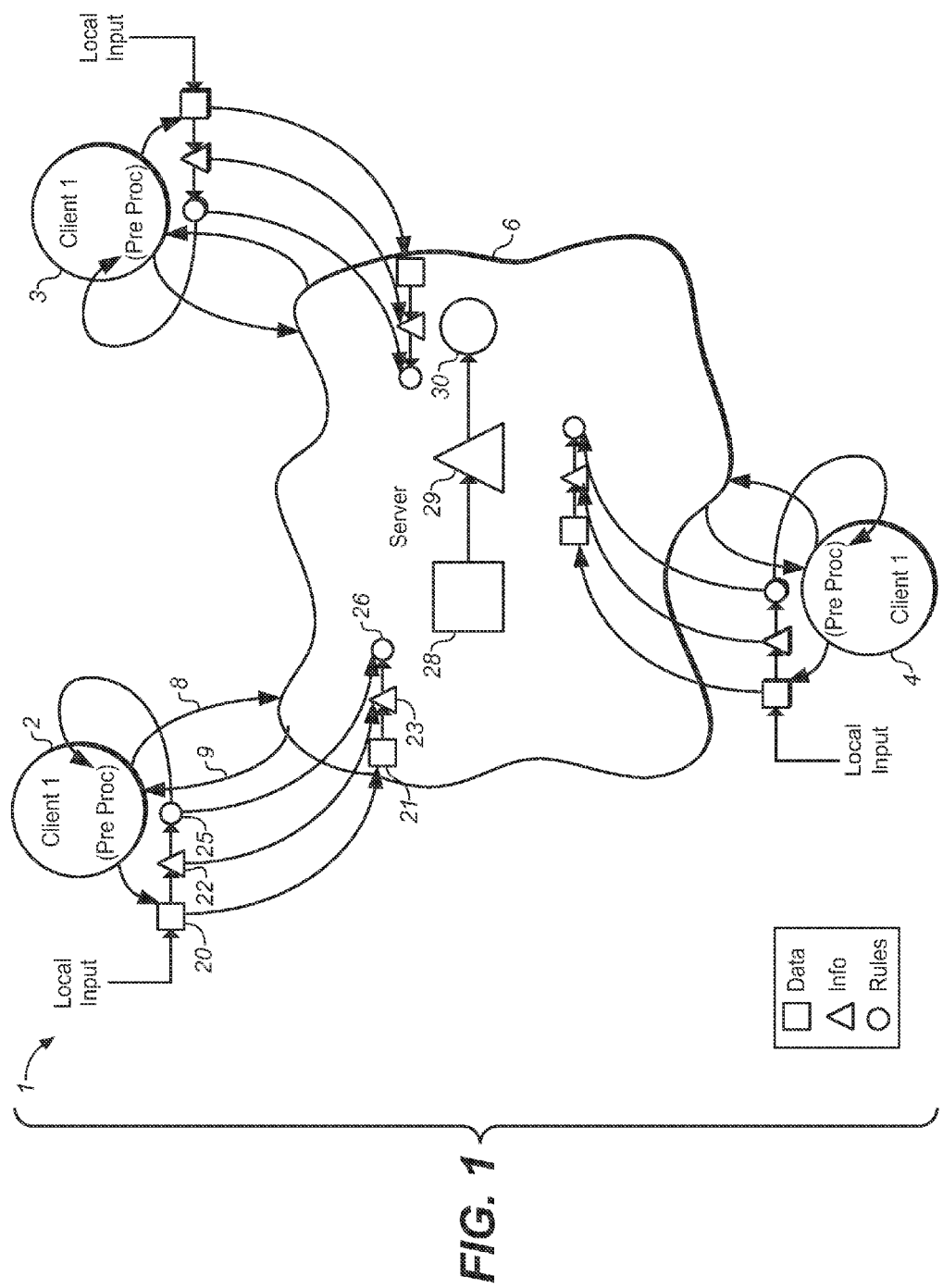
FIG. 1 illustrates schematically a VoIP environment including additional monitoring facilities to implement context aware processing.

The preferred embodiments of the present invention propose a metric for the manifest performance and behavior of the calling participants during the conference call. Whilst the direct source of the problem may not be known, if an aberrant human behavior is observed within the conference call, this is utilised in a measure which can be attributed to a failure of the call provision infrastructure and not specific endpoint failures.

The preferred embodiments relate generally to an integrated conferencing system where it is possible to have direct access to all of the client actions and/or a set of state variables for a conference as would be available on a central server(s) or prime host of a conference. The embodiments are presented specifically as related to a voice conferencing system, however it should be apparent and is envisaged that the invention also can be directed to systems additionally video and/or other sensory and communicative information between parties. Some examples include shared media, text, whiteboard, visual slides, other audio content, control data (such as used in games and online collaborative systems), file transfer and generally anything reducible to digital data sent and consumed between parties in a real time manner.

The core of the preferred embodiment provides the use of algorithms, heuristics and trained classifiers (machine learning) to identify transitions between states of conference activity, focusing on particular patterns of aberrant human behavior that would indicate some failing or undesirable performance of the conferencing system.

It is of particular noted importance that the preferred embodiments provide a means of assessing conference QoS in systems that dynamically take advantage of conferencing dynamics in a meeting in order to provide inhomogeneous distribution of provisioning resources (Blundell and Mathy 2004). By way of specific example, a particular conference participant that is listening and not contributing much directly could be allocated a poor network link in one or both directions. Audio on the downstream link could be of larger latency to the main bodies of the conference, and take advantage of redundant coding or forward error correction, which whilst incurring a delay, would create an acceptable QoS over a poor network link. Audio on the upstream link is infrequent and need only be of substantive quality once that participant is engaged in interaction with the other participants. Such a dynamic allocation of resources within a conference is reasonable to project, however the current prior art measures of QoS based on MOS derived from physical parameters and appropriate models is not well suited to such optimized resource allocation in conferences.

Ultimately, a conference call could be degraded in terms of service provision to the point that that it becomes problematic for one or more users. As such, it should depend on the relative importance and requirements of conference participants, not just the MOS obtained for the set of links. The preferred embodiments provide a means of assessing the appropriate quality of a complete conference by observance the behaviors of the users.

The preferred embodiments provide for context aware processing, in that a result or outcome is achieved by taking advantage of a wide set of information obtained across the conference call and user end points.

Turning initially to FIG. 1, there is illustrated an example operational environment of the preferred embodiment 1 of the context aware clients 2-4 engaged in a conference call via server 6. The conference is conducted via VoIP connections 8, 9. The server 6 is responsible for the implementation conferencing system. In the embodiment an example Voice over IP network (VoIP) is shown 1 having three of communications links between the clients, and maintains a separate relevant data stream, information flow and rules of implementation between each client and the server.

The network environment of the preferred embodiment 1 of the context-aware conferencing system could be both wired or wireless network conditions such as LAN/WAN, WiFi, 2G/3G/4G, Bluetooth etc. The clients' type could be PC, tablet or mobile clients etc.

A separate analysis network is also provided. This includes a flow of Data 20, 21, Information 22, 23 and Rules 25, 26.

Data is collected at either the endpoints 20 or the edge of the conference server 21 on each of the participants. This data can include some or all of the following: —Voice activity time aligned with the rest of the conference participants; Connection and disconnections; Changes in volume level of speaking—emphasis on any increased level; Repetition; Noise levels, characteristic and changes over time; Nuisance level; Echo or residual echo level; Specific type and hardware in use at an end point; change of device configuration or hardware at an endpoint. Additional data that can be recorded can include: Time of connection and disconnections for the conference call; voice activity at each endpoint and therefore across the conference call; Noise, voice and nuisance levels at each endpoint; Muting of endpoints.

Each end point monitors a set of data (e.g. noise level, VAD activity), and reduces this to information (e.g. problematic endpoint, % recent voice activity) and this can be used in a set of rules implemented by rule units e.g. 25 towards actions. A similar structure of data, information and rules is replicated 21, 23, 26 for the interface of each client into the server, and for the server overall 28, 29, 30. It is the rules 30 on the server, which has data flow from all the end points e.g. 20, 22, 25 and server interfaces 21, 23, 26, that can be used to generate the effective conference metrics based on abberant human behavior.

The preferred embodiments are based on the observation that a productive conference will follow a characteristic behavior pattern between parties.

The aggregation of this information is used to detect a set of potential fault behaviors or responses typical of a conferencing problem. Some examples can include: unexpected long silent pauses in a conference ("Are we still online?"); a participant, who has been active a lot, suddenly drops mid dialogue without any confirmation or response from others as to their imminent departure; a long silence is followed by a pause and an 'Are you still there?' type response; a particular person drops out of the conference and activity becomes stalled, silent, or sporadic until they return and typical productive dialogue is resumed; the use of local endpoint muting even when there is little voice activity (local conversations) that is being suppressed; repetition of voice discussions with increased voice level indicating difficulty communicating; an aberrant 'what?' and then louder response; an end point causing nuisance (assuming nuisance control not in place) indicated by a regular and/or increasing frequency of short non voice transmissions; an interruption of the main speaker, followed by activity indicating parties working out who is causing the 'interference' and then one party muting soon after; attempted communication—someone joining the conference only to leave soon after, or repeatedly try and reconnection; abnormal trends in parameters such as echo level or gain control leading to abberant transmission characteristics or nuisance level.

A set of directed rules and data derived (machine learning) classifiers can be used to provide some reliability of identifying aberrant human behavior. Through continued utilisation and data collection, the classifier system and rules can be continually evolved. As there are a wide variety of conference use cases, the system design can also include a classifier that detects 'normal' activity at some point in the conference, and the presence of any aberrant activity is noted with a level of confidence in that classification, and measured against the confidence that normal conference activity was present between at least some of the participants.

Machine learning can provide a level of detection and prediction of aberrant behavior that occurs prior to a complete call link or conference failure (one or more users disconnecting due to poor QoS). Recent work in analyzing the patterns in meetings suggests this is a mature area (Dong, Lepri et al. 2012) however, it is generally utilized in monitoring and improving the performance and effectiveness of individuals in small meetings.

The following pseudo code represents the overall structure or algorithm

At each endpoint:
Capture data for each frame;
Determine aggregate information;
If substantive change in information, notify or update server;
At the server:
Receive each information update from endpoints as data;
Aggregate the data as information;
Perform a set of classification and/or rules against the conference state information;
Aggregate this using counting and averages in a logic block to create a measure of the conference fault likelihood and confidence. This could be equated to a MOS for the conference in terms of known acceptable levels of performance that would cause the identified aberrant human behavior.

Figure 2:
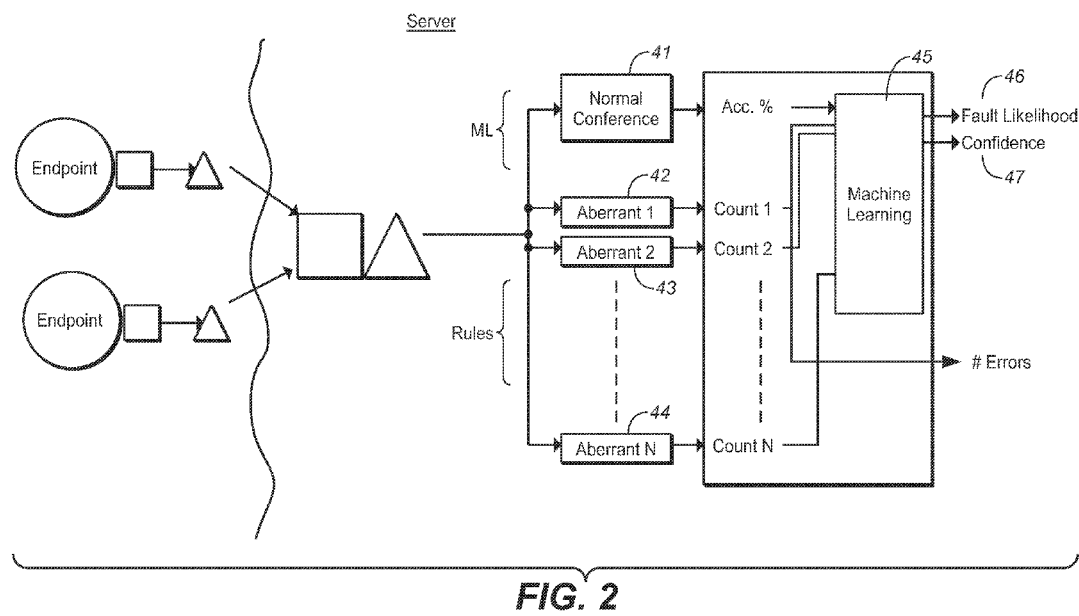
FIG. 2 illustrates a portion of the arrangement of FIG. 1.

Returning to FIG. 2, there is illustrated the server processing portions of an embodiment. A first classifier 41 is used to identify the dynamics of a normal meeting. This is used to infer the confidence that any identified aberrant event is differentiated from the normal conference activity, and avoids false alarms of unusual use case conferences. This can be a data trained component.

The remaining classifiers 42, 43, 44 are proposed as rules that can be inferred from the above list of example fault behaviors. These can be listed out as decision rules in more detail as required.

In alternative embodiments, there is provided a means of logging all of the raw data to an archive system for subsequent 'off-line' analysis. The classifiers can thereby be individually trained. This then allows for greater flexibility in the nature of the analysis processing, ease of collation of data across the entire conference, access to historical data from each endpoint and user, and flexibility around the current and future algorithms that may be applied in the analysis.

The preferred embodiments are based on the observation that the efficient and aberrant meeting can have different meeting dynamics patterns. So the aberrant human behavior confidence level can be constructed based on the meeting dynamics analysis. As an example of an embodiment, a multi-point meeting can be modelled as a 3-state Markov process and then the method of aberrant confidence level estimation can be based on meeting dynamic analysis.

Figure 3:
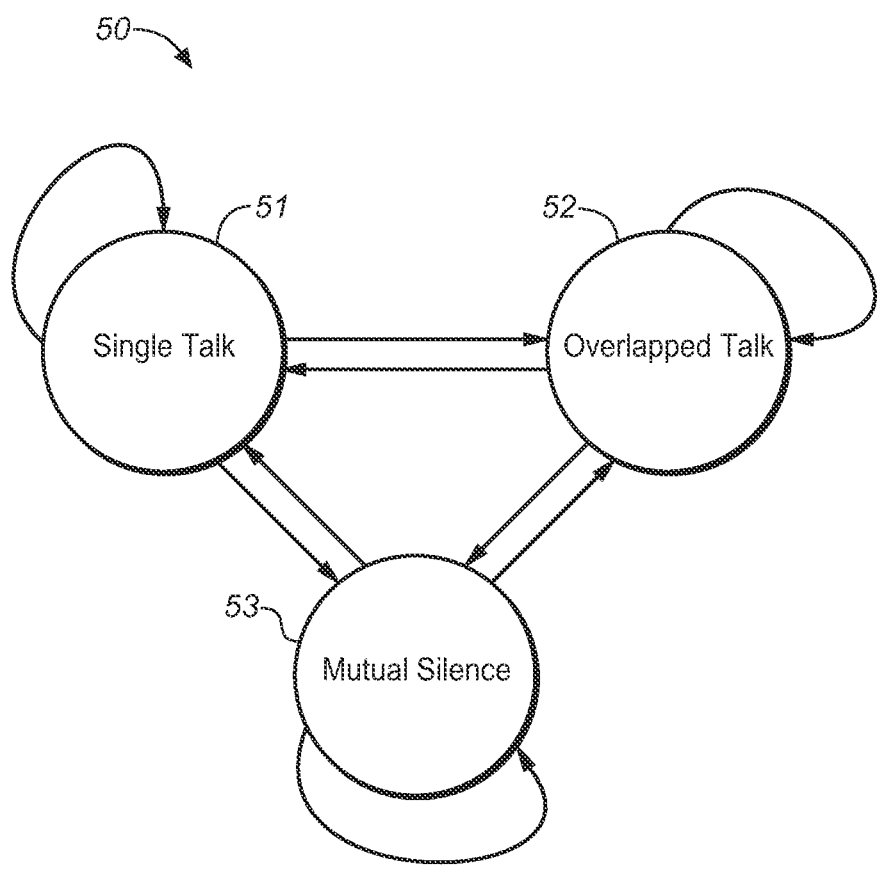
FIG. 3 illustrates a 3-state Markov process modelling of a multi-point meeting.

As for the conference model, ITU-T P.59 presents a two-party conversation model for generating artificial conversational speech. K. Hoeldtke and A. Raake extend the two-party model to three parties [K. Hoeldtke and A. Raake 2011]. These conversation models are concise and describe the conversations when the numbers of the parties are small (eg. two-party). However, when the numbers of the parties increase, the states of the conversation model will increase rapidly. To simplify the number of states, a multi-point meeting can be modelled, as shown in FIG. 3, as a 3-state Markov process 50 as follows: State Single Talk (ST) 51: denotes the situation that only single party in the meeting is talking; State Overlapped Talk (OT) 52: two or more than two parties are talking simultaneously in the meeting; State Mutual Silence (MS) 53: reflects the situation that all the parties are silent;

For a typical multi-point conferencing, when there are aberrant human behaviors, the 3-state Markov process will show some aberrant statistics. For example:

1) when there are unexpected long silent pauses of both parties, the statistics of mutual silence and single talk will be aberrant;

2) when the speech collision of different parties increases a lot because of the latency increase of the conferencing system, the statistics of overlapped talk analysis will be aberrant;

3) when a particular person drops out of the conference, the single talk statistic from the specific party will be aberrant;

4) when the number of the participants in the meeting is aberrant because of the link failure of network, the single-talk statistics of some specific party will be aberrant;

5) when there are attempted communication behavior, someone joining the conference only to leave soon after, or repeatedly try and reconnect, the single-talk statistics of the specific party will be aberrant;

To get the statistics of multi-point conferencing, a parametric meeting analysis can be undertaken based on the 3-state multi-point conference model of FIG. 3.

Figure 4:
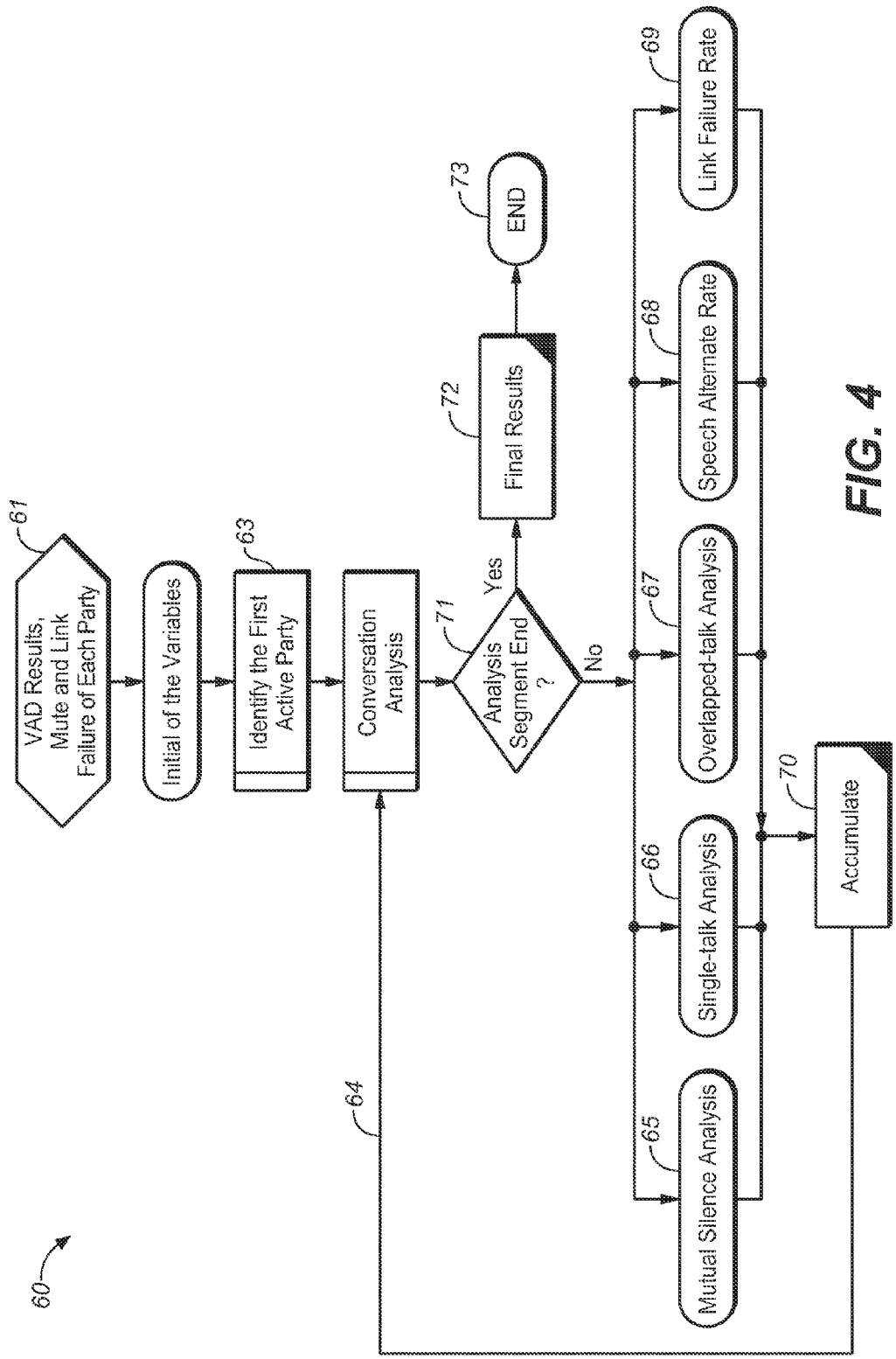
FIG. 4 illustrates the flow chart of a parametric meeting analysis.

The flow chart of the algorithm can be seen in FIG. 4. After the voice activity, mute and failure information of each party in the multi-point conferencing are collected 61 for each analysis segment, the first active party will be first identified 63 and then the conversation analysis will be done segment by segment 64. Apart from the single-talk 66, overlapped talk 67 and mutual silence analysis 65, speaker alternate rate 68 and link failure rate 69 can also be analyzed.

The module of parametric meeting analysis (PMA) can be expressed as follows:

$$PMA(k)=\{\lambda_{ST}(k),\lambda_{MS}(k),\lambda_{OT}(k),SAR(k),LFR(k)\}$$

where $\lambda_{ST}(k)$ is the frame number of single-talk in the kth conversation analysis segment; $\lambda_{MS}(k)$ is the frame number of mutual silence in the kth conversation analysis segment; $\lambda_{OT}(k)$ is the frame number of overlapped-talk in the kth conversation analysis segment; SAR(k) is the speaker alternate rate in the kth conversation analysis segment; and LFR(k) is the link failure rate in the kth conversation analysis segment;

Aberrant Confidence Level (ACL) Estimation

Based on the parametric meeting analysis, an aberrant confidence level can be estimated based on heuristic rules or machine learning. As an example, one of the embodiment based on heuristic rules is outlined below.

Define N as the total number of parties in the multi-point conferencing, and i as the index of the party. The indicator of aberrant physical parameters behavior (echo level, noise level, nuisance level or AGC level) in party i can be defined as follows:

$$I^i(k) = \begin{cases} 1, & \text{if } \lambda^i(k) > \xi_{th} \\ 0, & \text{otherwise} \end{cases}$$

where, $\lambda^i(k)$ is the statistics of physical parameters and $\xi_{th}$ is the threshold of the aberrant statistics of physical parameters of party i.

A final aberrant human behavior confidence level can be estimated as follows:

$$ACL9K0 = \begin{bmatrix} (\lambda_{ms}(k) \geq \gamma_{th}) \| (\lambda_{OT}(k) \geq \zeta_{th}) \| (LFR(k) \geq \eta_{th}) \| \\ 1, \quad \left( \sum_{i=1}^{N} I^i(k) \geq \kappa_{th} \times N \right) \\ 0, \quad \text{otherwise} \end{bmatrix}$$

where, $\gamma_{th}$ is the threshold of the aberrant statistics of mutual silence; $\zeta_{th}$ is the threshold of the aberrant statistics of overlapped talk; $\eta_{th}$ is the threshold of the aberrant statistics of link failure rate and $\kappa_{th}$ is the threshold of the percentage.

Another feature that can be used to discriminate the effective and aberrant meeting is "meeting entropy". Defining a whole frame number in the kth conversation analysis segment, as follows:

$$\lambda(k)=\lambda_{ST}(k)+\lambda_{OT}(k)+\lambda_{MS}(k)$$

the probability of the single-talk in the kth conversation analysis segment can be defined as:

$$P_{ST}(k) = \frac{\lambda_{ST}(k)}{\lambda(k)} \times 100\%$$

The probability of the overlapped-talk in the kth conversation analysis segment can be defined as:

$$P_{OT}(k) = \frac{\lambda_{OT}(k)}{\lambda(k)} \times 100\%$$

The probability of mutual silence in the kth conversation analysis segment can be defined as:

$$P_{MS}(k) = \frac{\lambda_{MS}(k)}{\lambda(k)} \times 100\%$$

The "meeting entropy" of the multi-point conferencing then can be deduced as follows:

$$E(k) = \sum_{I=\{ST,DT,MS\}} -P_I(k)\log_2(P_I(k))$$

The meeting entropy of identified aberrant event can show different characteristics compared with normal conference activities. The meeting entropy measure can be used by the machine learning (ML) classifier 45 of FIG. 2.

Meeting Dynamics

Three types of meeting are very common (http://www.meeting-studyguide.com/type-meeting.htm): 1) Information—giving, 2) Information—taking and 3) Problem—solving. The analysis of conversational dynamics in small groups, is a fundamental area in social psychology and non-verbal communication [Goodwin, 1981, Clark and Carlson, 1982]. Conversational patterns exist at multiple time scales, ranging from knowing how and when to address or interrupt somebody, how to gain or hold the conversation, and how to make transitions in discussions. Most of these mechanisms are multimodal, involving multiple verbal and nonverbal cues for their display and interpretation [Knapp and Hall, 2005], and have an important effect on how people are socially perceived, e.g., whether they are dominant, competent, or extraverted [Knapp and Hall, 2005, Pentland, 2008]. The embodiments of the invention can utilise these teachings in an overall learning system to determine the operational characteristics of the invention.

Examples and Illustrations

Figure 5:
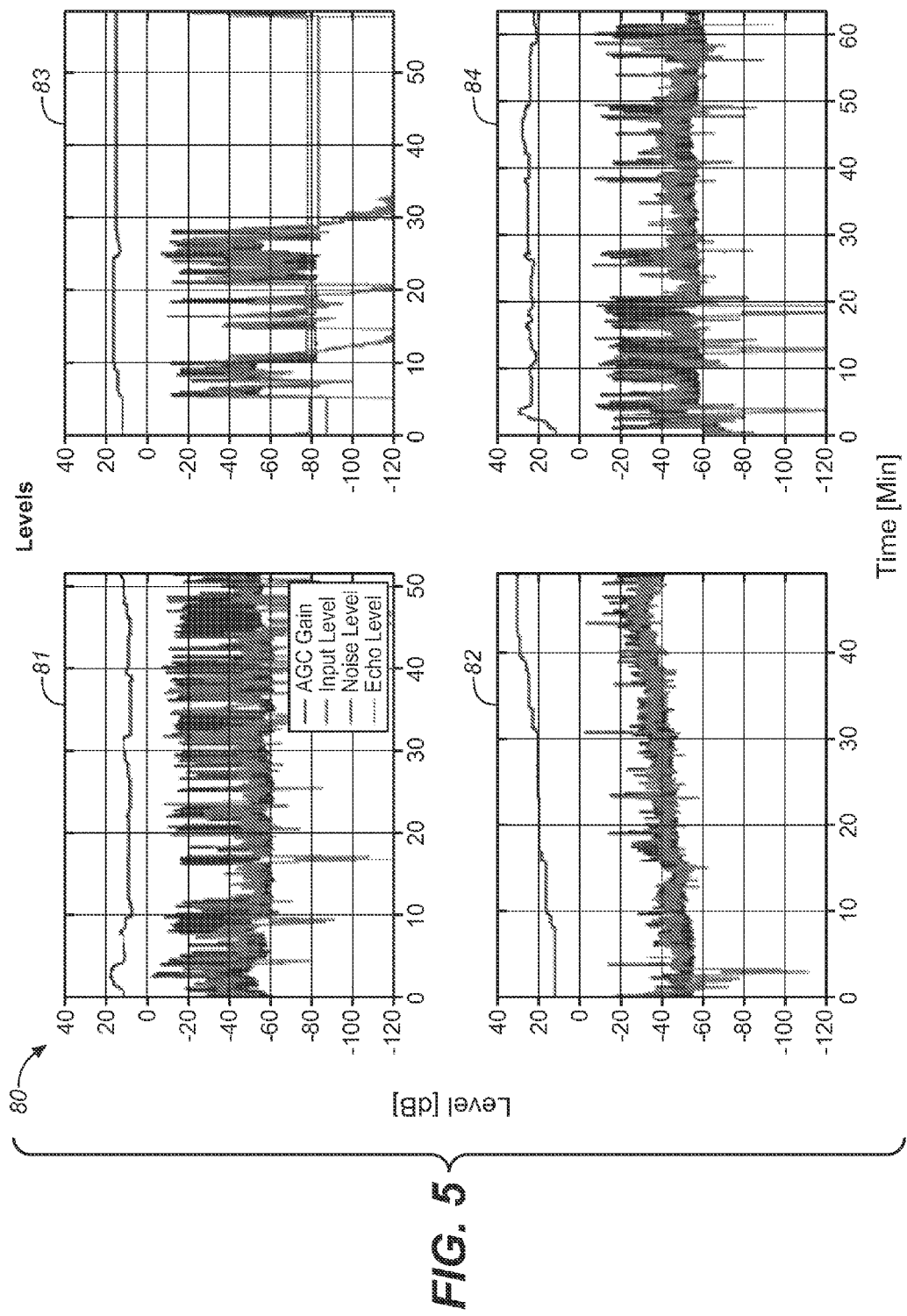
FIG. 5 illustrates the output from an effective statistics log showing AGC, Input, Noise and Echo levels.

The following example is drawn from analysis of the conference state using a statistics gathering approach. Turning initially to FIG. 5, there is shown the outputs 81-84 from the statistics log of a conference call showing AGC level e.g. 85, Input level, noise level and echo levels.

It is evident that the user represented in the lower left hand corner 82 has an abberant and continual slow increase in gain control. This is typical of a problem known as 'creep' where the system is levelling to some sporadic background activity. When an analysis of the talk activity from this conference is undertaken, it was seen that this user's talk activity seemed to clash with the other conference participants, indicating an uncooperative user or, more likely, some endpoint fault. This is confirmed when viewing the profile of talk burst length which shows a prevalence of short activity which increases as the AGC ramps up over time.

Thus the analysis of the behavior of an end point and logs, used in conjunction with known typical human behavior, provides a powerful fault analysis tool. The steady increase in gain control and therefore noise level is uncharacteristic of a normal situation, the end point is transmitting in an uncooperative fashion and with talk segments too short in duration to be conversational. The departure from expected human behavior indicates this fault condition.

Figure 6:
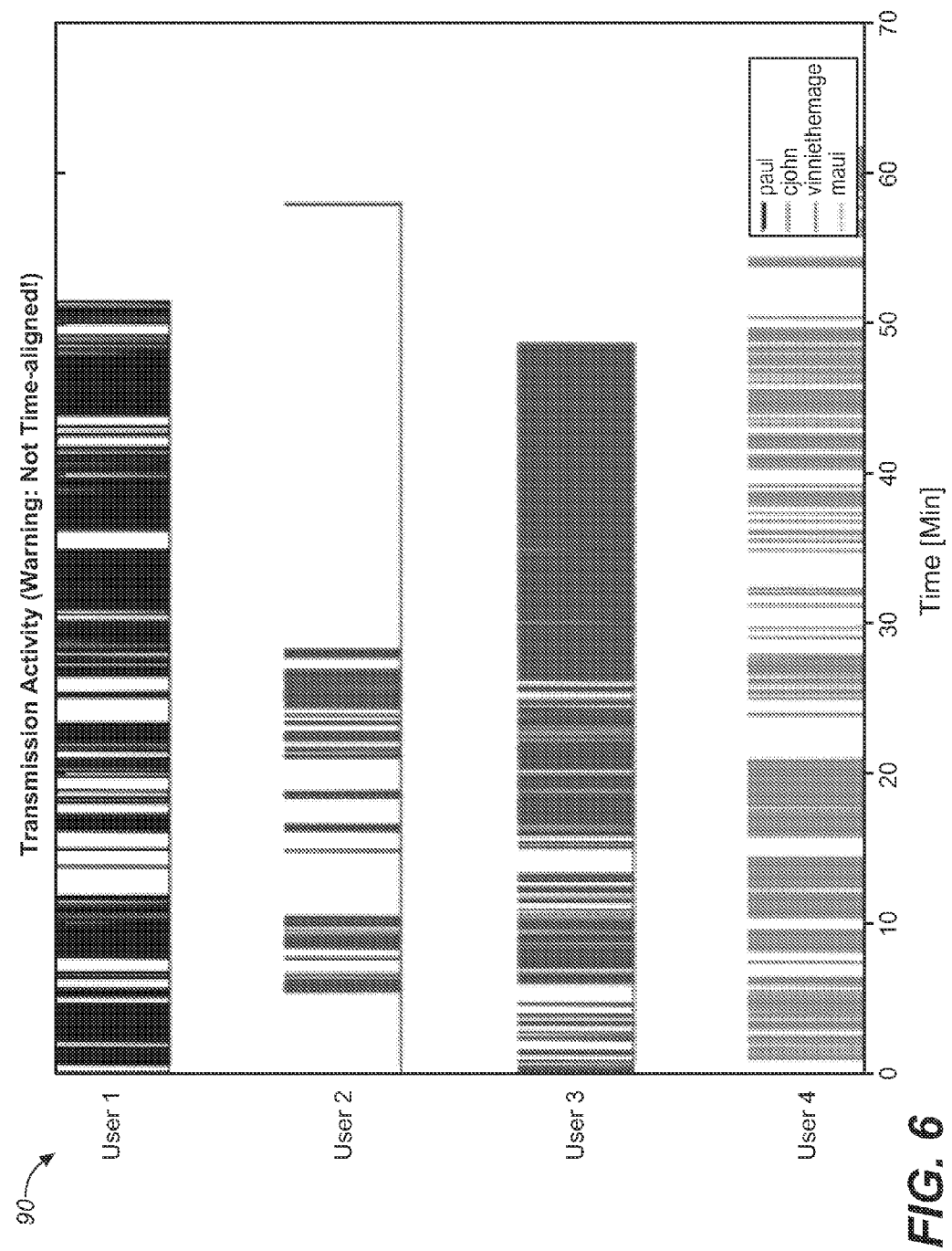
FIG. 6 illustrates an example log of the voice activity from the speakers across the duration of a conference.

FIG. 6 illustrates a log of the voice activity from the speakers across the duration of an example conference. It is noted that the activity 91 in the user 3 at around the 10 second mark corresponds to a low input level or SNR, and also seems to be unrelated to other parties 13 indicating improper human behavior or some system problem.

Figure 7:
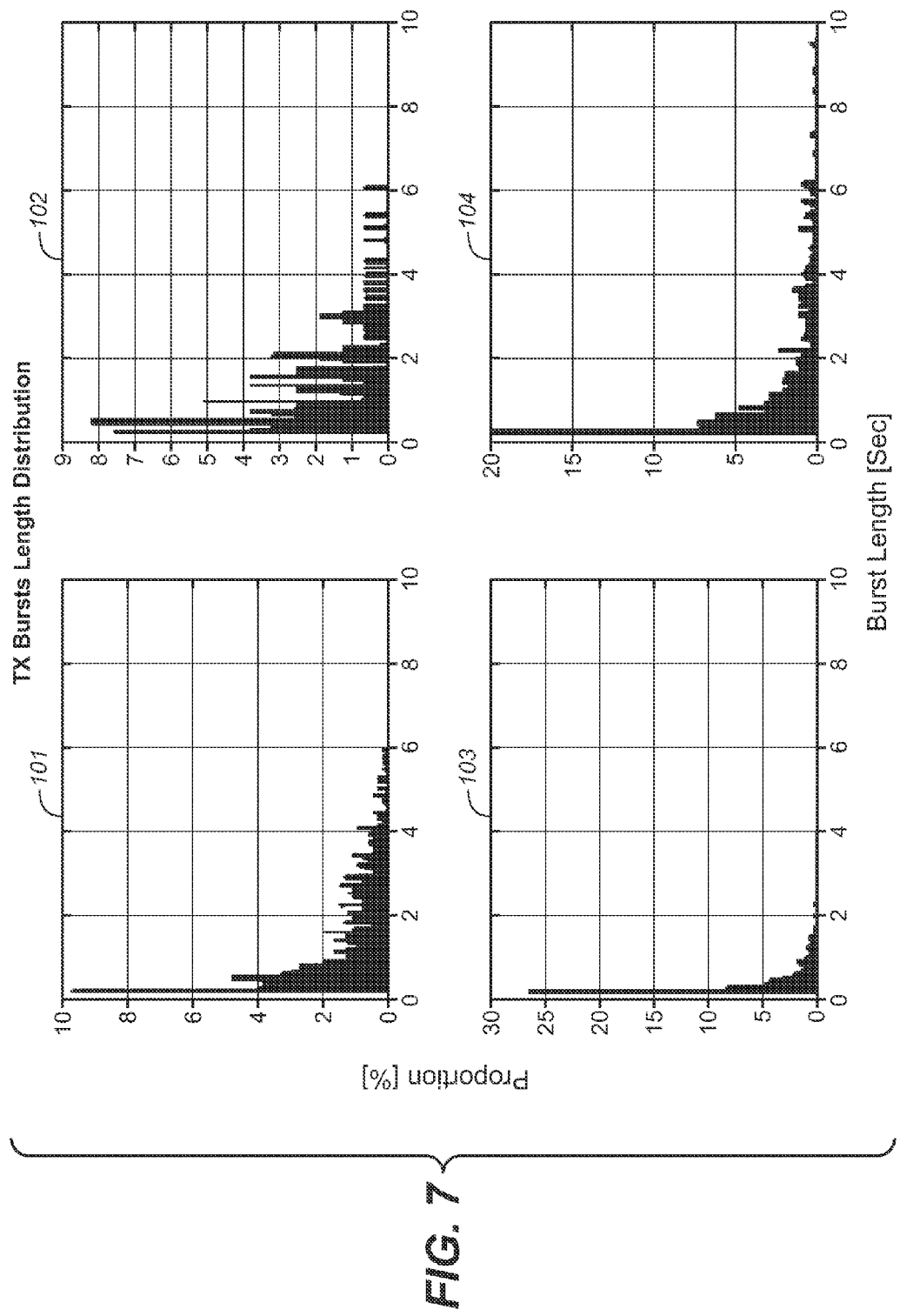
FIG. 7 illustrates example transmission burst length distributions for a series of conference conversations.

FIG. 7 illustrates an analysis of transmission burst lengths for an example conference for different users 101-104. Most users show a typical profile of talk bursts extending from 1 to 6 seconds as is derived from analysis of normal human behavior in such conferences. The lower left user shows an aberrant percentage of very short transmissions, again indicating the false alarm detection and creep problem.

Extensions

Measures based on simple observable physical parameter can be used in such a way as to create a feedback control loop for provisioning the required conference service resources to achieve a certain user experience QoS. In the present embodiments, it is envisaged that the measure of fault or aberrant human behavior will occur with (generally) a low frequency. The preferred embodiments can have the following implementation characteristics:

Identify groupings of conference and users having a similar network proximity or service provision.

For each group:

Note the current longer term average of the QoS due to aberrant behavior measure.

If this is high:

Act to assign additional resources to members of that group to lower the likelihood of user complaint (increase the QoS);

If the longer term average is currently low and it is suspected that a reduction in resource allocation may be possible without a significant increase in complaint:

Select a subsample of the group having the lowest premium costing or lowest customer retention value Decrease a specific resource an amount estimated in relation to the current excess of service provision Monitor the prevalence of aberrant behavior indicating fault or conference problem (as per current disclosure)

Where such behavior over time is absent, then similarly adjust the resources of other members of the identified similarity group As an extension of the preferred embodiments, the participants voice patterns can be analysed for cognitive load or stress level. There has been some recent work that provides a measure of monitoring a subjects cognitive load or stress level from voice characteristics (Yin and Chen 2007). This work can be directly adapted to provide a measurement input. Given that such processing may be run on the client system with little cost to the overall conferencing system architecture, the measurement input may form another informational input to use in identifying problematic conferencing service provision.

In alternative embodiments, the system can also include the collection of data relating to physical parameters (such as network performance) or specific voice quality and use this in the simultaneous estimate of quality and impact on user behavior.

Adaptive Objective Model Development

An interesting extension of preferred embodiments is to utilise the observation of human behavior in real operational systems to improve objective models for predicting performance. Certain efficiencies of behavior can reasonably be associated with a well performing system, whilst certain inefficiencies or aberrant behaviors can be related to poor performance.

Prior art in objective models is based on large amounts of listening to very short segments of audio. In practice, there are many factors that suggest such controlled and constrained listening is not applicable to predicting system use utility, particularly in the domain of audio conferencing. Further, the set of conventional objective models are only predictions of a limited set of data arising from structured tests. The general standard and body of work around this is found in standards ITU-T P.862 and ITU-T P.863 (PESQ/POLQA).

By taking a more direct measure of the effectiveness of a system—user use time, meeting entropy, engagement, attentive end points etc, it is possible to get possibly even more meaningful results about field performance and value of a system. Since within the system there are many conventional features and predictions, there is an immediate ability to conduct a large data analysis exercise for the prediction of aberrant human behavior from the operational data.

In some embodiments, uncertain objective measures can be aggregated to predict the conference quality experience. An alternative approach presented is to track behavior to estimate the operational efficiency of conference users. At that point, a new measure of quality arises (where quality is related to functional efficiency), and then it is possible to create models that predict this measure of quality. Where the operational system includes a large number of users and a large degree of access, the potential for aggregating and analyzing tracking data to create predictive models of behavior is also significant.

Further Embodiments—Hybrid Model

In some embodiments, the importance of physical parameters can be weighted such that the conference system performance is predicted based on a hybrid model of aberrant human behavior and physical parameters.

Different methodologies can be utilized in combining the two approaches. For example, a classifier could be built using both physical parameters (packet loss/burstiness, delay, codec bit rate, SNR, echo, endpoint device, etc) and human dynamics (conversational analysis, number of participants, prosody analysis, emotion analysis, other demographic info, etc). Also, dimensional reduction pre-processing techniques, such as Principal Component Analysis (PCA) can be used to reduce the volume of training data. In further alternatives, correlations can be determined between the physical and human dynamics features by using techniques such as Canonical Correlation (CCA), which provides enough flexibility in dealing with random variables with different dimensionality.

Various models can be trained separately since the features may operate on a different time and quantity scale and have different treatment on feature extraction and statistical model selection. For example, physical parameters are often on a continuous scale which would be suitable for a regression based approach. On the other hand, some of the human dynamics features may be categorical, which makes a decision tree based classifier a good choice. Of course, the actual physical implementation will be influential in any final form. Further, some machine learning algorithms are capable of handling both categorical and numerical inputs and outputting discrete categorical outputs (classification) or continuous values (regression) with proper modifications. With two separately trained models, a final output can be generated through a simple voting/average depending on if a label or a numerical value is needed for the output.

In a more of a hierarchical approach, one of the models can be selected as a dominant model depending on which model has higher confidence (e.g. better prediction accuracy on the testing data set). In other embodiments, other factors can be used for dominant model selection, for instance, complexity, real-time factor etc. As an example, if the physical model is selected as the dominant model, a first result can be generated indicating a potential bad conference and a confidence score, which can function as a reliability indicator for the result. If the confidence score is low, the human dynamic model is triggered and evaluated. If the human dynamic model also indicates a possible poor conference experience, we would have a higher confidence to label it as a problematic meeting.

Another modification is to collect video and audio data for off line processing. Joint video motion and spatial(mono) audio analysis is a reasonably well researched area, where many techniques can be explored for human dynamics analysis.

There is further opportunity for combination with known systems for estimating the Quality of Service (QoS) for voice and video conferencing. Such known systems are often focused on determining or estimating the physical parameters that may affect system performance and relating this to the user experience. General parameters can include network link quality and delay. Many QoS systems are not integrated into the actual conferencing system, and others are concerned with the link quality to each single end point and then aggregating these to create a complete conference QoS measure. It is apparent that most severe issues of QoS result in a conference failure, or set of human behavior sequences that indicate a problematic meeting. The preferred embodiments use the presence of aberrant human behavior to indicate an issue with a present conferencing experience that would be likely to result in a complaint or user dissatisfaction. Since the measures includes all aspects of importance of participants and function of the present conference (where the quality of critical links has a higher importance) the approach naturally lends itself to a greater range of call QoS optimization algorithms that take advantage of conference asymmetry.

As will be evident to those skilled in the art, the present invention has application to most forms of group interactions over a network environment. Whilst the preferred embodiment shall be discussed with reference to a telephone type conference call, other forms of conferencing between participants is envisaged by the invention. The invention has equal application to other forms of real time group interactions.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A system for determining the underlying quality of service provided to participants at endpoints in a networked conferencing system, the system including:
   a series of collection units for collection and aggregation of system state information from the participating endpoints of a conference;
   a first classification unit, for classifying the conference activity as being normative of an effective meeting between the participants;
   at least a second classification unit for classifying the conference activity as being non-normative of an effective meeting between the participants;
   an aggregator interconnected to said first classification unit and at least said second classification unit, said aggregator determining therefrom a fault likelihood level and confidence level based on the output from said first and second classification unit.

2. A system as in claim 1 where at least one of the collection unit collects state information including the synchronized voice or communication activity of participants at each end point.

3. A system as claimed in claim 2 wherein said system state information includes the voice level changes over time at each endpoint.

4. A system as claimed in claim 2 wherein said system state information includes mutual silence of the participants over time at each endpoint.

5. A system as claimed in claim 2 wherein said system state information includes the degree of overlap in speech of the participants.

6. A system as claimed in claim 2 wherein said system state information includes single talk of the participants over time at each endpoint.

7. A system as claimed in claim 2 wherein said system state information includes the residual echo level changes over time at each endpoint.

8. A system as claimed in claim 2 wherein said system state information includes the microphone mute changes of the participants.

9. A system as claimed in claim 2 wherein said system state information includes the link failure and reconnection of the participants.

\* \* \* \* \*